United States Patent
Otani et al.

(10) Patent No.: US 8,041,211 B2
(45) Date of Patent: *Oct. 18, 2011

(54) OPTICAL SIGNAL QUALITY MONITORING APPARATUS AND METHOD

(75) Inventors: Akihito Otani, Atsugi (JP); Takao Tanimoto, Hadano (JP)

(73) Assignee: Anritsu Corporation, Atsugi-Shi, Kanagawa (JP)

(*) Notice: Subject to any disclaimer, the term of this patent is extended or adjusted under 35 U.S.C. 154(b) by 702 days.

This patent is subject to a terminal disclaimer.

(21) Appl. No.: 12/085,876

(22) PCT Filed: Dec. 11, 2007

(86) PCT No.: PCT/JP2007/073877
§ 371 (c)(1),
(2), (4) Date: May 30, 2008

(87) PCT Pub. No.: WO2008/087809
PCT Pub. Date: Jul. 24, 2008

(65) Prior Publication Data
US 2010/0150548 A1    Jun. 17, 2010

(30) Foreign Application Priority Data
Jan. 15, 2007 (JP) ................... 2007-005761

(51) Int. Cl.
H04B 10/08 (2006.01)

(52) U.S. Cl. ................ 398/25; 398/32; 398/33

(58) Field of Classification Search ............. 398/25–33, 398/154
See application file for complete search history.

(56) References Cited

U.S. PATENT DOCUMENTS
6,396,601 B1    5/2002  Takara et al.
(Continued)

FOREIGN PATENT DOCUMENTS
JP              5-196641 A        8/1993
(Continued)

OTHER PUBLICATIONS
An English language International Search Report dated Mar. 18, 2008, issued in a counterpart International Application.
(Continued)

Primary Examiner — Dzung Tran
(74) Attorney, Agent, or Firm — Holtz, Holtz, Goodman & Chick, P.C.

(57) ABSTRACT

A sampling optical pulse generation unit emits a sampling optical pulse. The sampling optical pulse has a period different from a predetermined offset time to integral multiplication of a clock period of a data signal, and the data signal modulates an optical signal of a monitoring target. An optical sampling unit performs sampling of the optical signal of the monitoring target using an electroabsorption optical modulator. The electroabsorption optical modulator has a characteristic in which an absorption index is changed with respect to light propagating through an optical path according to a level of an electric field. The optical signal of the monitoring target is input into one of two optical terminals of the electroabsorption optical modulator. The sampling optical pulse is input into another of the two optical terminals through a photocoupler. The absorption index with respect to the optical signal of the monitoring target is lowered by generating a mutual absorption saturation characteristic of the electroabsorption optical modulator when the sampling optical pulse is supplied, and the sampling of the optical signal of the monitoring target is performed to output an optical pulse signal from the other of the two optical terminals through the photocoupler.

12 Claims, 5 Drawing Sheets

U.S. PATENT DOCUMENTS

| | | | |
|---|---|---|---|
| 6,483,287 | B2 | 11/2002 | Otsubo et al. |
| 7,174,098 | B2 | 2/2007 | Yokoyama |
| 7,532,818 | B2 * | 5/2009 | Hsu et al. ............... 398/27 |
| 7,835,643 | B2 * | 11/2010 | Futami et al. ............ 398/25 |
| 2002/0126352 | A1 * | 9/2002 | Shake et al. ............ 359/124 |
| 2002/0126362 | A1 | 9/2002 | Shimomura |
| 2003/0011837 | A1 | 1/2003 | Shake et al. |
| 2004/0131369 | A1 | 7/2004 | Yokoyama |
| 2005/0047788 | A1 | 3/2005 | Miyazaki |
| 2009/0232513 | A1 * | 9/2009 | Otani et al. ............. 398/154 |

FOREIGN PATENT DOCUMENTS

| | | |
|---|---|---|
| JP | 11-223575 A | 8/1999 |
| JP | 2005-337844 A | 2/2002 |
| JP | 2003-90766 A | 3/2003 |
| JP | 2004-222252 A | 8/2004 |
| JP | 2004-286511 A | 10/2004 |
| JP | 2005-70698 A | 3/2005 |
| JP | 2002-055124 A | 12/2005 |
| JP | 3796357 B2 | 4/2006 |

OTHER PUBLICATIONS

International Preliminary Report on Patentability and Written Opinion of the International Searching Authority dated Jul. 30, 2009 (7 pages), issued in counterpart International application No. PCT/JP2007/073877.

Japanese Office Action dated Jan. 25, 2011, and English translation thereof issued in a Japanese Application No. 2008-529396, which is a Japanese counterpart of related U.S. Appl. No. 12/160,072.

U.S. Appl. No. 12/160,072; First Named Inventor: Akihito Otani; Title: "Optical Signal Synchronization Sampling Apparatus and Method, and Optical Signal Monitoring Apparatus and Method Using the Same"; Filed: Jul. 3, 2008.

* cited by examiner

OPTICAL SIGNAL QUALITY MONITORING APPARATUS AND METHOD

This application is a U.S. National Phase Application under 35 USC 371 of International Application PCT/JP2007/073877 filed Dec. 11, 2007.

TECHNICAL FIELD

The present invention relates to an optical signal quality monitoring apparatus and method, and particularly to optical signal quality monitoring apparatus and method which can correctly monitor quality of an optical signal modulated by a high-speed data signal.

BACKGROUND ART

In forming a network using the optical signal modulated by the data signal, it is necessary to monitor the quality of the optical signal propagating through the network with the optical signal quality monitoring apparatus.

Generally, the optical signal quality monitoring apparatus obtains information on a waveform of a signal on a transmission path, and computes a value indicating the signal quality from the waveform information and supplies the computation result. Therefore, in the optical signal quality monitoring apparatus, it is extremely difficult to obtain the waveform information by a photodetector directly receiving the optical signal which is modulated by a data signal having a bit rate very high as tens of Gb/s.

In a conventional optical signal quality monitoring apparatus, an equivalent time sampling method is adopted to obtain the information on the waveform of the high-speed optical signal.

In the equivalent time sampling method, sampling is performed to an optical signal P in which the same waveform is repeated at a period Ta as shown in (a) of FIG. 6 using a sampling pulse S having a period of $Ts=N \cdot Ta+\Delta T$ which is slightly longer than N multiplications (N is an integer) of the period Ta by a time $\Delta T$ as shown in (b) of FIG. 6, thereby obtaining instantaneous amplitude values (instantaneous intensity) at positions shifted from each other by $\Delta T$ in the repetitive waveform of the optical signal P as shown in (c) of FIG. 6.

A waveform P' drawn by an envelope curve connecting the obtained instantaneous amplitude values is one in which the waveform of the optical signal P is enlarged by a factor of $Ts/\Delta T$ on a temporal axis. The waveform P' retains the waveform characteristics of the original optical signal P.

Accordingly, a probability distribution of an amplitude indicating one of binary levels and an amplitude indicating another of the binary levels is obtained for the waveform information obtained by the equivalent time sampling, and a Q value indicating the signal quality can be obtained by computation of a standard deviation of the probability distribution.

For example, Patent Document 1 discloses a technique of performing the equivalent time sampling to the optical signal to compute the Q value indicating the signal quality from the obtained waveform information.

Patent Document 1: Japanese Patent No. 3796357

In the technique disclosed in Patent Document 1, usually a non-linear optical material is used as an element for performing the equivalent time sampling to the optical signal.

Because the non-linear optical material usually has low sampling efficiency (sampling efficiency measured by a waveform conversion phenomenon, that is, waveform conversion efficiency is not more than −20 dB), high S/N can be obtained for the information on the waveform of the strong optical signal while poor S/N is obtained for the information on the waveform of the weak optical signal.

Therefore, it is thought that an electroabsorption optical modulator having a transmission loss which is significantly lower than that of the non-linear optical material, in other words, the substantially high sampling efficiency is used as the element for performing the equivalent time sampling to the optical signal.

The electroabsorption optical modulator has a characteristic in which an absorption index is changed with respect to a light beam passed through an optical path according to a level of an electric field imparted to the optical path connecting two optical terminals. In the electroabsorption optical modulator, the optical signal is fed into one of the optical terminals, an electric sampling pulse signal is imparted to a power supply terminal, and the absorption index is lowered with respect to the optical signal to supply the sampling pulse signal from another of the optical terminals only when the sampling pulse signal is fed, thereby performing the sampling to the optical signal.

For example, Patent Document 2 discloses a technique of imparting the electric sampling pulse signal to the power supply terminal of the electroabsorption optical modulator to perform the sampling to the optical signal.

Patent Document 2: Jpn. Pat. Appln. KOKAI Publication No. 2004-222252

However, in the technique disclosed in Patent Document 2, high-frequency impedance matching is required in the electric sampling pulse signal, and it is extremely difficult that a pulse width of the electric sampling pulse signal is stably narrowed without ringing. Therefore, there is generated a new problem in that the information on the waveform of the optical signal modulated at tens of Gb/s cannot accurately be obtained with sufficient resolution.

DISCLOSURE OF INVENTION

In order to solve the problems of the conventional technique, an object of the invention is to provide optical signal quality monitoring apparatus and method, in which the sampling can accurately be performed to the information on the waveform of the high-speed optical signal with the high sampling efficiency and sufficient resolution, whereby the quality of the optical signal can correctly be monitored.

In order to achieve the above-described object, according to a first aspect of the present invention, there is provided an optical signal quality monitoring apparatus comprising:

a sampling optical pulse generation unit (21) which emits a sampling optical pulse (Ps) having a period Ts different from a predetermined offset time $\Delta T$ to integral N multiplication of a clock period Tc of a data signal modulating an optical signal (Px) of a monitoring target;

an optical sampling unit (22) which supplies an optical pulse signal (Py) obtained by sampling the optical signal (Px) of the monitoring target using the sampling optical pulse (Ps) emitted from the sampling optical pulse generation unit (21);

a photoelectric converter (30) which receives the optical pulse signal (Py) supplied from the optical sampling unit (22), and converts the optical pulse signal (Py) into an electric signal (Ey) to supply the electric signal (Ey); and a computation unit (35) which computes a value indicating quality of the optical signal (Px) of the monitoring target based on the electric signal (Ey) from the photoelectric converter (30), wherein the optical sampling unit (22) includes:

an electroabsorption optical modulator (23) which has two optical terminals (23a, 23b) used to input and output light, and a power supply terminal (23c) imparting an electric field to an optical path connecting the two optical terminals (23a, 23b), the electroabsorption optical modulator (23) having a characteristic in which an absorption index is changed with respect to the light propagating through the optical path according to a level of the electric field, the electroabsorption optical modulator (23) receiving the optical signal (Px) of the monitoring target at one of the two optical terminals (23a, 23b);

a direct-current power supply (24) which applies a predetermined direct-current voltage (Vdc) to the power supply terminal (23c) of the electroabsorption optical modulator (23), the electroabsorption optical modulator (23) exhibiting a high absorption index with respect to the optical signal (Px) of the monitoring target at the predetermined direct-current voltage (Vdc); and a photocoupler (25) which receives the sampling optical pulse (Ps) emitted from the sampling optical pulse generation unit (21) of the optical signal sampling apparatus (100) to input the sampling optical pulse (Ps) into another of the two optical terminals (23a, 23b) of the electroabsorption optical modulator (23), and receives the optical signal (Px) of the monitoring target emitted from the other of the two optical terminals (23a, 23b) of the electroabsorption optical modulator (23) to input the optical signal as the optical pulse signal (Py) into the photoelectric converter (30), wherein when the sampling optical pulse (Ps) is supplied, the absorption index is lowered by a mutual absorption saturation characteristic of the electroabsorption optical modulator (23), and the optical signal (Px) of the monitoring target is passed onto a side of the other of the two optical terminals (23a, 23b) of the electroabsorption optical modulator (23) to perform sampling.

In order to achieve the above-described object, according to a second aspect of the present invention, there is provided the optical signal quality monitoring apparatus according to the first aspect, wherein, in order to prevent leakage of the sampling optical pulse (Ps) to a transmission path of the optical signal (Px) of the monitoring target, the sampling optical pulse (Ps) being input into the other of the two optical terminals (23a, 23b) of the electroabsorption optical modulator (23), the optical sampling unit (22) further includes:

a second photocoupler (26) which is inserted into the one of the two optical terminals (23a, 23b) of the electroabsorption optical modulator (23); and an optical terminator (27) which terminates the sampling optical pulse (Ps) through the second photocoupler (26).

In order to achieve the above-described object, according to a third aspect of the present invention, there is provided the optical signal quality monitoring apparatus according to the first aspect, wherein the sampling optical pulse generation unit (21) includes:

a reference signal generator (21a) having a synthesizer configuration in which a stable signal (Ra) is produced, the stable signal (Ra) having a period Ts corresponding to a period of the sampling optical pulse (Ps);

a multiplier (21b) which supplies the stable signal (Ra) as a signal (Rb) multiplied by a factor of M (M is more than one), the stable signal (Ra) being produced by the reference signal generator (21a) and having the period Ts;

a light source (21d) which emits continuous light (Pcw);

an optical modulator (21c) which modulates the continuous light (Pcw) emitted from the light source (21d) by the signal (Rb) multiplied by the factor of M supplied from the multiplier (21b), thereby emitting an optical pulse having a period Ts/M;

an optical gating circuit (21e) which thins out the optical pulse (Pa) emitted from the optical modulator (21c) into 1/M, and converts the optical pulse into an optical pulse (Pb) having the period Ts; and a dispersion-decreasing fiber (21f) which narrows a pulse width of the optical pulse (Pb) having the period Ts and converted by the optical gating circuit (21e), and emits the optical pulse in a form of the sampling optical pulse (Ps).

In order to achieve the above-described object, according to a fourth aspect of the present invention, there is provided the optical signal quality monitoring apparatus according to the first aspect, further including a parameter setting unit (28) which receives information on a clock period Tc of the data signal modulating the optical signal (Px) of the monitoring target or information on a bit rate of the data signal and information on the predetermined offset time ΔT to obtain a sampling period Ts of the sampling optical pulse (Ps) from computation of $$Ts = N \cdot Tc + \Delta T$$

(where a value of N is determined by the clock period Tc of the data signal and a frequency variable range of a signal which can be supplied from the sampling optical pulse generation unit (21)), the parameter setting unit (28) setting the sampling period Ts of the sampling optical pulse (Ps) in the sampling optical pulse generation unit (21).

In order to achieve the above-described object, according to a fifth aspect of the present invention, there is provided the optical signal quality monitoring apparatus according to the first aspect, further including an analog/digital (A/D) converter (31) which is inserted between the photoelectric converter (30) and the computation unit (35), converts the electric signal (Ey) from the photoelectric converter (30) into a digital value by sampling the electric signal (Ey) with a sampling clock (Es) synchronized with the sampling optical pulse (Ps), and supplies the digital value as a data signal (Dy) to the computation unit (35).

In order to achieve the above-described object, according to a sixth aspect of the present invention, there is provided the optical signal quality monitoring apparatus according to the fifth aspect, wherein the sampling clock (Es) is output while the sampling optical pulse generation unit (21) synchronizes the sampling clock (Es) with the sampling optical pulse (Ps).

In order to achieve the above-described object, according to a seventh aspect of the present invention, there is provided an optical signal quality monitoring method comprising:

a sampling optical pulse generation step of emitting a sampling optical pulse (Ps) having a period (Ts) different from a predetermined offset time ΔT to integral N multiplication of a clock period Tc of a data signal modulating an optical signal (Px) of a monitoring target;

an optical sampling step of supplying an optical pulse signal (Py) obtained by sampling the optical signal (Px) of the monitoring target using the sampling optical pulse (Ps) emitted by the sampling optical pulse generation step;

a photoelectric conversion step of receiving the optical pulse signal (Py) supplied by the optical sampling step and converting the optical pulse signal (Py) into an electric signal (Ey) to supply the electric signal (Ey); and a computation step of computing a value indicating quality of the optical signal (Px) of the monitoring target based on the electric signal (Ey) from the photoelectric conversion step, wherein the optical sampling step includes:

a step of preparing an electroabsorption optical modulator (23) which has two optical terminals (23a, 23b) used to input and output light, and a power supply terminal (23c) imparting an electric field to an optical path connecting the two optical terminals (23a, 23b), the electroabsorption optical modulator (23) having a characteristic in which an absorption index is changed with respect to the light propagating through the optical path according to a level of the electric field, the electroabsorption optical modulator (23) receiving the optical signal (Px) of the monitoring target at one of the two optical terminals (23a, 23b);

a step of preparing a direct-current power supply (24) which applies a predetermined direct-current voltage (Vdc) to the power supply terminal (23c) of the electroabsorption optical modulator (23), the electroabsorption optical modulator (23) exhibiting a high absorption index with respect to the optical signal (Px) of the monitoring target at the predetermined direct-current voltage (Vdc); and a step of preparing a photocoupler (25) which receives the sampling optical pulse (Ps) emitted by the sampling optical pulse generation step to input the sampling optical pulse (Ps) into another of the two optical terminals (23a, 23b) of the electroabsorption optical modulator (23), and receives the optical signal (Px) of the monitoring target emitted from the other of the two optical terminals (23a, 23b) of the electroabsorption optical modulator (23) to output as the optical pulse signal (Py) converting into the electric signal (Ey) by the photoelectric conversion step, wherein when the sampling optical pulse (Ps) is supplied, the absorption index is lowered by a mutual absorption saturation characteristic of the electroabsorption optical modulator (23), and the optical signal (Px) of the monitoring target is passed onto a side of the other of the two optical terminals (23a, 23b) of the electroabsorption optical modulator (23) to perform sampling.

In order to achieve the above-described object, according to an eighth aspect of the present invention, there is provided the optical signal quality monitoring method according to the seventh aspect, wherein, in order to prevent leakage of the sampling optical pulse (Ps) to a transmission path of the optical signal (Px) of the monitoring target, the sampling optical pulse (Ps) being input into the other of the two optical terminals (23a, 23b) of the electroabsorption optical modulator (23), the optical sampling step further includes:

a step of preparing a second photocoupler (26) which is inserted into the one of the two optical terminals (23a, 23b) of the electroabsorption optical modulator (23); and a step of preparing an optical terminator (27) which terminates the sampling optical pulse (Ps) through the second photocoupler (26).

In order to achieve the above-described object, according to a ninth aspect of the present invention, there is provided the optical signal quality monitoring method according to the seventh aspect, wherein the sampling optical pulse generation step includes:

a step of preparing a reference signal generator (21a) having a synthesizer configuration in which a stable signal (Ra) is produced, the stable signal (Ra) having a period Ts corresponding to a period of the sampling optical pulse (Ps);

a step of preparing a multiplier (21b) which supplies the stable signal (Ra) as a signal (Rb) multiplied by a factor of M (M is more than one), the stable signal (Ra) being produced by the reference signal generator (21a) and having the period Ts;

a step of preparing a light source (21d) which emits continuous light (Pcw);

a step of preparing an optical modulator (21c) which modulates the continuous light (Pcw) emitted from the light source (21d) by the signal (Rb) multiplied by the factor of M supplied from the multiplier (21b), thereby emitting an optical pulse having a period Ts/M, a step of preparing an optical gating circuit (21e) which thins out the optical pulse (Pa) emitted from the optical modulator (21c) into 1/M, and converts the optical pulse (Pa) into an optical pulse (Pb) having the period Ts; and a step of preparing a dispersion-decreasing fiber (21f) which narrows a pulse width of the optical pulse (Pb) having the period Ts and converted by the optical gating circuit (21e), and emits the optical pulse in a form of the sampling optical pulse (Ps).

In order to achieve the above-described object, according to a tenth aspect of the present invention, there is provided the optical signal quality monitoring method according to the seventh aspect, further including a step of preparing a parameter setting unit (28) which receives information on a clock period Tc of the data signal modulating the optical signal (Px) of the monitoring target or information on a bit rate of the data signal and information on the predetermined offset time ΔT to obtain a sampling period Ts of the sampling optical pulse (Ps) from computation of $$Ts = N \cdot Tc + \Delta T$$

(where a value of N is determined by the clock period Tc of the data signal and a frequency variable range of a signal which can be supplied by the sampling optical pulse generation step), the parameter setting unit (28) setting the sampling period Ts of the sampling optical pulse (Ps) in the sampling optical pulse generation unit (21).

In order to achieve the above-described object, according to an eleventh aspect of the present invention, there is provided the optical signal quality monitoring method according to the seventh aspect, further including an analog/digital (A/D) conversion step of converting the electric signal (Ey) from the photoelectric conversion step into a digital value by sampling the electric signal (Ey) with a sampling clock (Es) synchronized with the sampling optical pulse (Ps) and supplying the digital value as a data signal (Dy), wherein, in the computation step, a value indicating quality of the optical signal (Px) of the monitoring target is computed based on the data signal (Dy) supplied by the A/D conversion step.

In order to achieve the above-described object, according to a twelfth aspect of the present invention, there is provided the optical signal quality monitoring method according to the eleventh aspect, wherein, in the computation step, the data signal (Dy) is compared with a predetermined threshold value and is classified into a sample value belonging to data "1" and a sample value belonging to data "0", an average value and a standard deviation of a group of sample values are obtained for each of the data "1" and the data "0", and a ratio ($\mu/\gamma$) of a difference ($\mu$) between the average values of the data "1" and the data "0" and a sum ($\gamma$) of the standard deviations is obtained as a quality value (Q).

Thus, in the optical signal quality monitoring apparatus and method of the invention, the electroabsorption optical modulator is used as the sampling element, the optical signal of the monitoring target is input into one of the optical terminals, the predetermined direct-current voltage exhibiting the high absorption index with respect to the optical signal of the monitoring target is imparted to the power supply terminal, the sampling optical pulse is input into another of the optical terminals of the electroabsorption optical modulator through the photocoupler, the absorption index is lowered with respect to the optical signal of the monitoring target by the mutual absorption saturation characteristics generated when the sampling optical pulse is input, and the optical signal of the monitoring target is supplied from the other of the optical terminals.

Therefore, the optical pulse having the narrow width can be used for the sampling, the sampling efficiency can be enhanced with respect to the optical signal of the monitoring target, and the information on the waveform can accurately be obtained even if the optical signal of the monitoring target is weak.

BEST MODE FOR CARRYING OUT THE INVENTION

An apparatus and a method for monitoring optical signal quality according to an embodiment of the invention will be described below with reference to the drawings.

Figure 1:
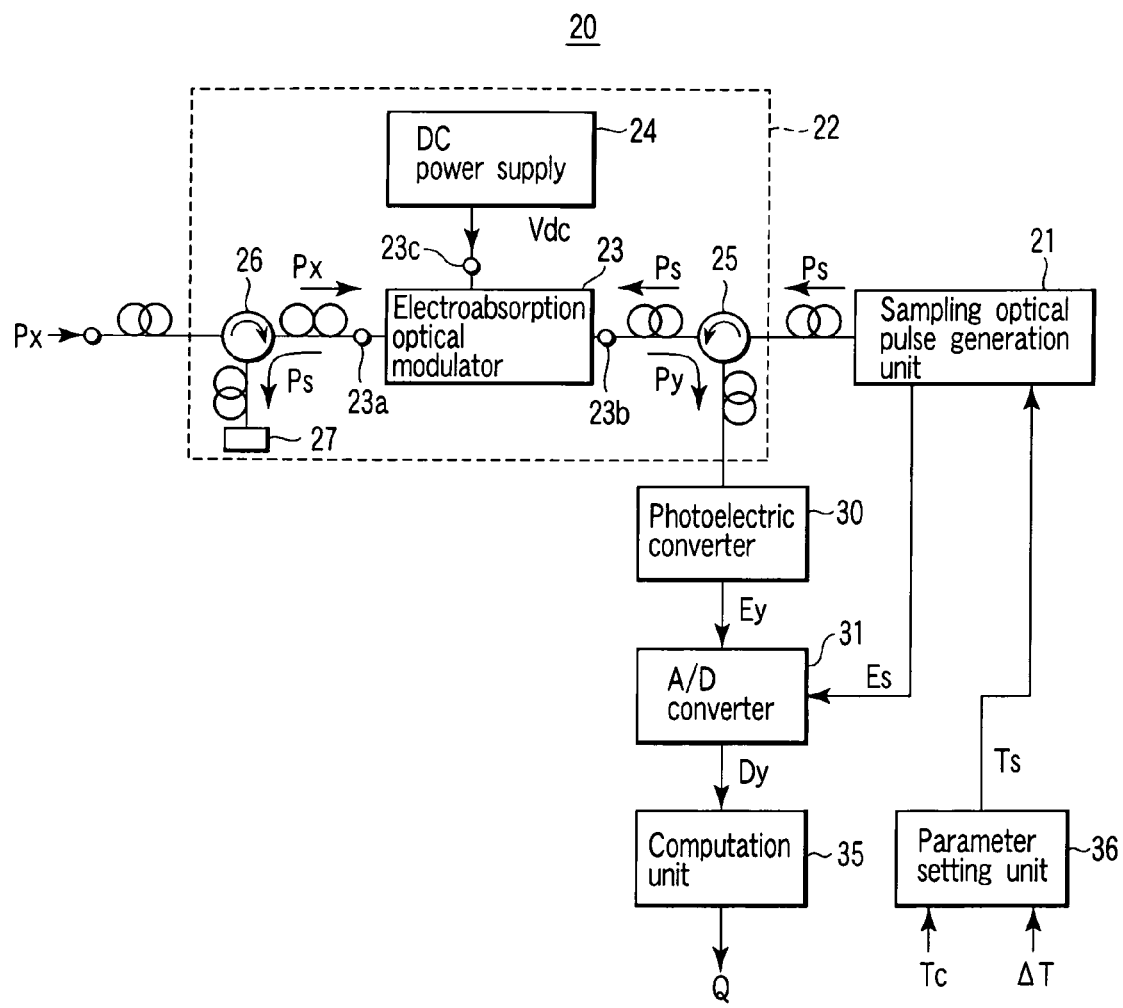
FIG. 1 is a block diagram showing configurations of optical signal quality monitoring apparatus and method according to an embodiment of the invention.

FIG. 1 is a block diagram showing configurations of an optical signal quality monitoring apparatus 20 and an optical signal quality monitoring method according to an embodiment of the invention.

A basic configuration of the optical signal quality monitoring apparatus 20 of the embodiment is as follows. The optical signal quality monitoring apparatus 20 includes a sampling optical pulse generation unit 21 which emits a sampling optical pulse Ps, the sampling optical pulse Ps having a period different from N integral multiplications of a clock period Tc of a data signal by a predetermined offset time ΔT, the data signal modulating an optical signal Px of a monitoring target; an optical sampling unit 22 which supplies an optical pulse signal Py, the optical pulse signal being obtained by sampling the optical signal of the monitoring target using the sampling optical pulse Ps emitted from the sampling optical pulse generation unit 21; a photoelectric converter 30 which receives the optical pulse signal Py supplied from the optical sampling unit 22, and converts the optical pulse signal into an electric signal Ey to supply the electric signal Ey; and a computation unit 35 which computes a value indicating quality of the optical signal Px of the monitoring target based on the electric signal Ey from the photoelectric converter 30. The optical sampling unit 22 includes an electroabsorption optical modulator 23 which has two optical terminals 23a and 23b and a power supply terminal 23c, the two optical terminals 23a and 23b being used to input and output light, the power supply terminal 23c imparting an electric field to an optical path connecting the two optical terminals 23a and 23b, the electroabsorption optical modulator 23 having a characteristic in which an absorption index is changed with respect to the light propagating through the optical path according to a level of the electric field, the electroabsorption optical modulator 23 accepting the optical signal of the monitoring target at one of the two optical terminals 23a and 23b; a direct-current power supply 24 which applies a predetermined direct-current voltage Vdc to the power supply terminal 23c of the electroabsorption optical modulator 23, the electroabsorption optical modulator 23 exhibiting a high absorption index with respect to the optical signal Px of the monitoring target at the predetermined direct-current voltage Vdc; and a photocoupler 25 which accepts the sampling optical pulse Ps to input the sampling optical pulse Ps into another of the two optical terminals 23a and 23b of the electroabsorption optical modulator 23, the sampling optical pulse Ps being emitted from the sampling optical pulse generation unit 21, the photocoupler 25 accepting the optical signal Px of the monitoring target to input the optical signal Px as the optical pulse signal Py into the photoelectric converter 30, the optical signal Px being emitted from the other of the two optical terminals 23a and 23b of the electroabsorption optical modulator 23. The sampling optical pulse Ps is supplied, whereby the absorption index is lowered by a mutual absorption saturation characteristic of the electroabsorption optical modulator 23, and the optical signal Px of the monitoring target is passed onto a side of the other of the two optical terminals 23a and 23b of the electroabsorption optical modulator 23 to perform the sampling.

A basic configuration of the optical signal quality monitoring method of the embodiment is as follows. The optical signal quality monitoring method includes a sampling optical pulse generation step of emitting a sampling optical pulse Ps, the sampling optical pulse having a period Ts different from N integral multiplications of a clock period Tc of a data signal by a predetermined offset time ΔT, the data signal modulating an optical signal Px of a monitoring target; an optical sampling step of supplying an optical pulse signal Py, the optical pulse signal being obtained by sampling the optical signal Px of the monitoring target using the sampling optical pulse Ps emitted by the sampling optical pulse generation step; a photoelectric conversion step of receiving the optical pulse signal Py supplied by the optical sampling step and converting the optical pulse signal Py into an electric signal Ey to supply the electric signal Ey; and a computation step of computing a value indicating quality of the optical signal Px of the monitoring target based on the electric signal Ey from the photoelectric conversion step. The optical sampling step includes a step of preparing an electroabsorption optical modulator 23 which has two optical terminals 23a and 23b and a power supply terminal 23c, the two optical terminals 23a and 23b being used to input and output light, the power supply terminal 23c imparting an electric field to an optical path connecting the two optical terminals 23a and 23b, the electroabsorption optical modulator 23 having a characteristic in which an absorption index is changed with respect to the light propagating through the optical path according to a level of the electric field, the electroabsorption optical modulator 23 accepting the optical signal Px of the monitoring target at one of the two optical terminals 23a and 23b; a step of preparing a direct-current power supply 24 which applies a predetermined direct-current voltage Vdc to the power supply terminal 23c of the electroabsorption optical modulator 23, the electroabsorption optical modulator 23 exhibiting a high absorption index with respect to the optical signal Px of the monitoring target at the predetermined direct-current voltage Vdc; and a step of preparing a photocoupler 25 which accepts the sampling optical pulse Ps to input the sampling optical pulse Ps into another of the two optical terminals 23a and 23b of the electroabsorption optical modulator 23, the sampling optical pulse Ps being emitted by the sampling optical pulse generation step, the photocoupler 25 accepting the optical signal Px of the monitoring target to output the optical signal Px as the optical pulse signal Py converting into the electric signal Ey by the photoelectric conversion step, the optical signal Px being emitted from the other of the two optical terminals 23a and 23b of the electroabsorption optical modulator 23. When sampling optical pulse Ps is supplied, the absorption index is lowered by a mutual absorption saturation characteristic of the electroabsorption optical modulator 23, and the optical signal Px of the monitoring target is passed onto a side of the other of the two optical terminals 23a and 23b of the electroabsorption optical modulator 23 to perform the sampling.

The optical signal quality monitoring apparatus 20 and optical signal quality monitoring method of the invention will specifically be described below.

In the optical signal quality monitoring apparatus 20 and optical signal quality monitoring method of the invention, the optical signal Px is set to a monitoring target. The optical signal Px is modulated by the data signal which is transmitted on optical network (not shown) and has the predetermined clock period Tc.

The sampling optical pulse generation unit 21 generates a sampling optical pulse Ps to supply the sampling optical pulse Ps to the optical sampling unit 22. The sampling optical pulse Ps has a period Ts different from the predetermined offset time ΔT to the N integral multiplications of the clock period Tc of the data signal, and the data signal modulates the optical signal Px of the monitoring target.

Any configuration may be adopted for the sampling optical pulse generation unit 21 as long as it can produce the period Ts in which the optical pulse having a narrow width is specified.

Figure 2:
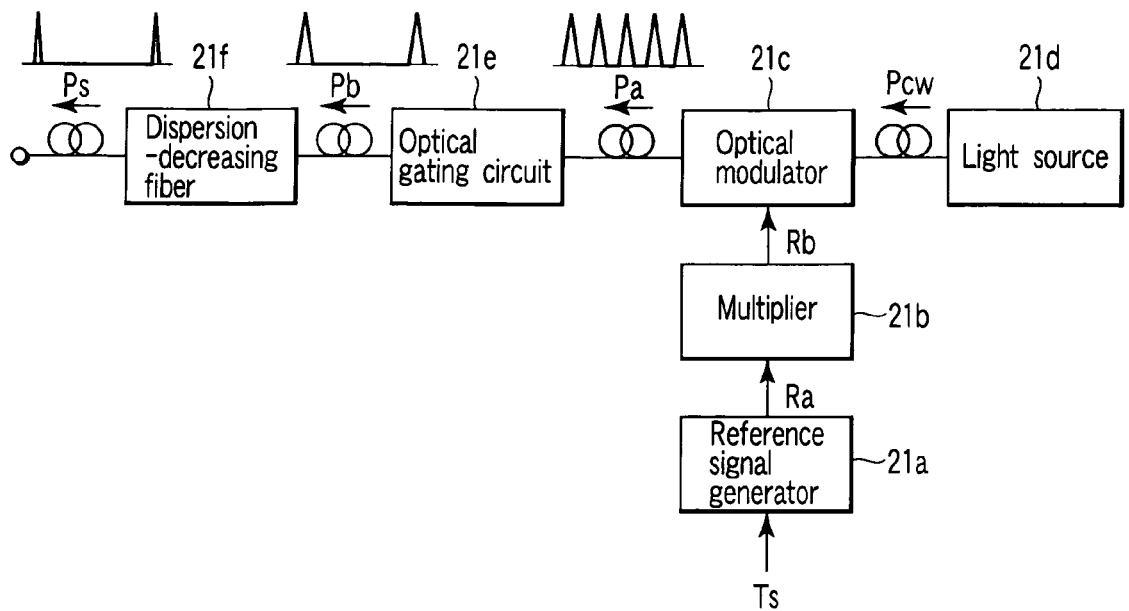
FIG. 2 is a block diagram showing an example of a configuration of a main part of FIG. 1.

FIG. 2 is a block diagram showing an example of the sampling optical pulse generation unit 21.

The sampling optical pulse generation unit 21 includes: a reference signal generator 21a having a synthesizer configuration in which a stable signal Ra is produced, the signal Ra having the period Ts corresponding to a period of the sampling optical pulse Ps; a multiplier 21b which supplies the stable signal Ra as a signal Rb multiplied by a factor of M (M is more than one), the signal Ra being produced by the reference signal generator 21a and having the period Ts (frequency: Fs); a light source 21d which emits continuous light Pcw; an optical modulator 21c which modulates the continuous light Pcw by the signal Rb multiplied by the factor of M, thereby supplying an optical pulse Pa having a period Ts/M, the continuous light Pcw being supplied from the light source 21b, the signal Rb being supplied from the multiplier 21b; an optical gating circuit 21e which thins out the optical pulse Pa into 1/M, the optical pulse Pa being supplied from the optical modulator 21c, the optical gating circuit 21e converting the optical pulse Pa into an optical pulse Pb having the period Ts; and a dispersion-decreasing fiber 21f which narrows a pulse width of the optical pulse Pb having the period Ts, the optical pulse Pb having the period Ts and converted by the optical gating circuit 21e, the dispersion-decreasing fiber 21f supplying the optical pulse as the sampling optical pulse Ps.

The reference signal generator 21a having the synthesizer configuration produces the stable signal Ra having the period Ts (frequency: Fs) specified by a parameter setting unit 28 described later. The stable signal Ra is input into the multiplier 21b, which multiplies the stable signal Ra by a factor of M (M is more than one). Then, the output signal Rb is input into the optical modulator 21c, and the signal Rb modulates the continuous light Pcw emitted from the light source 21d, thereby generating the optical pulse Pa having the period Ts/M.

The pulse width of the optical pulse Pa is narrowed to 1/M in comparison with the case where the continuous light Pcw is directly modulated by the signal Ra.

The optical gating circuit 21e thins out the optical pulse Pa into 1/M, and the optical pulse Pa is converted into the optical pulse Pb having the period Ts. Then, the optical pulse Pb is input into the dispersion-decreasing fiber 21f to narrow the pulse width of the optical pulse Pb, and the optical pulse Pb is finally supplied as the sampling optical pulse Ps.

On the other hand, the optical sampling unit 22 performs the sampling of the optical signal Px of the monitoring target using the sampling optical pulse Ps emitted from the sampling optical pulse generation unit 21, and supplies the optical pulse signal Py obtained by the sampling.

The optical sampling unit 22 includes the electroabsorption optical modulator 23, the direct-current power supply 24, and the circulator type photocoupler 25.

The electroabsorption optical modulator 23 has the two optical terminal 23a and 23b and the power supply terminal 23c. The two optical terminals 23a and 23b are used to input and output the light, and the power supply terminal 23c imparts the electric field to the optical path between the two optical terminals 23a and 23b. The electroabsorption optical modulator 23 has the characteristic in which the absorption index is changed with respect to the light propagating through the optical path according to the level of the electric field imparted to the optical path.

As disclosed in Patent Document 2, in the electroabsorption optical modulator 23, usually an electric sampling pulse signal is imparted to the power supply terminal 23c.

In the case of the electric sampling pulse signal, as described above, it is extremely difficult to produce the electric sampling pulse signal having the narrow width necessary to obtain the information on the waveform of tens of Gb/s.

Therefore, in the invention, as shown in FIG. 1, the optical signal Px is input into the optical terminal 23a of the electroabsorption optical modulator 23, the sampling optical pulse Ps having the narrow width is input into another optical terminal 23b through the photocoupler 25 while the predetermined direct-current voltage Vd indicating the high absorption index with respect to the optical signal Px is imparted from the direct-current power supply 24 to the power supply terminal 23c, the mutual absorption saturation characteristic of the electroabsorption optical modulator 23 is utilized to change the absorption index using the sampling optical pulse Ps, and the absorption index is lowered with respect to the optical signal Px of the monitoring target only when the sampling optical pulse Ps is fed. Therefore, the optical signal Px of the monitoring target is passed through the other optical terminal 23b to perform the sampling using the optical sampling pulse signal.

When the electroabsorption optical modulator 23 is used as the element for sampling the optical signal to perform the sampling with the optical sampling pulse signal, the sampling efficiency is determined by the insertion loss of the electroabsorption optical modulator 23.

Because the electroabsorption optical modulator 23 has the insertion loss of about −10 dB, the sampling efficiency of the invention becomes about −10 dB.

In the invention, the sampling efficiency of about −10 dB is improved by about 10 dB or more in comparison with about −20 dB in the case where the non-linear optical material is used as the element for sampling the optical signal like Patent Document 1.

Figure 3:
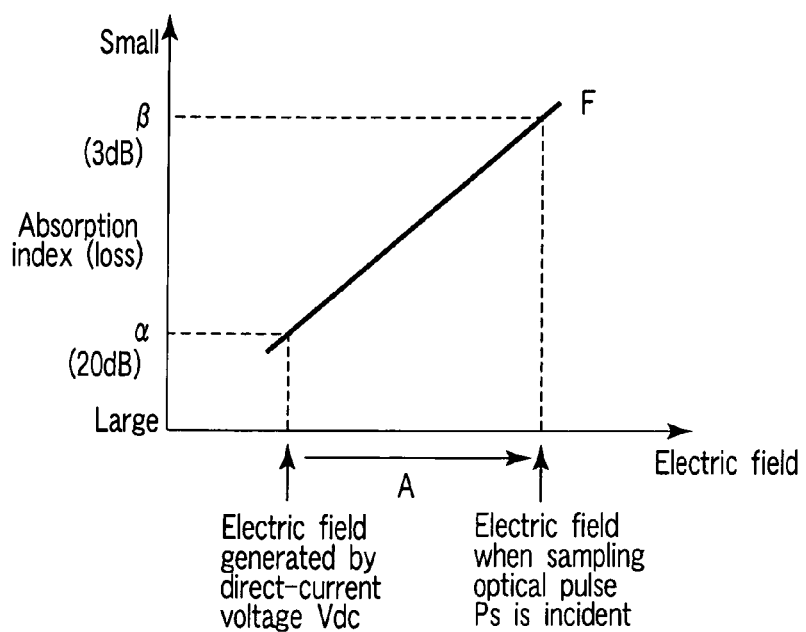
FIG. 3 is a view for explaining an example of characteristics of the main part of FIG. 1.

In the case where a change in characteristic of the absorption index with respect to the electric field of the electroabsorption optical modulator 23 is shown by the letter F of FIG. 3, it is assumed that the direct-current voltage Vdc, corresponding to the electric field in which the absorption index becomes a large value α (for example, 20 dB), is applied to the power supply terminal 23c of the electroabsorption optical modulator 23.

The sampling optical pulse Ps is input into the optical terminal 23b of the electroabsorption optical modulator 23 such that the electric field is substantially changed to a direction of an arrow A of FIG. 3 by the mutual absorption saturation characteristics to decrease the absorption index having peak intensity of a small value β (for example, 3 dB).

The characteristic F is schematically shown in FIG. 3.

That is, when the sampling optical pulse Ps is input into the optical terminal 23b of the electroabsorption optical modulator 23, the absorption index of the electroabsorption optical modulator 23 is lowered by the mutual absorption saturation characteristic of the electroabsorption optical modulator 23.

Therefore, the optical signal Px of the monitoring target which is fed into the optical terminal 23a of the electroabsorption optical modulator 23 is permitted to be passed through the electroabsorption optical modulator 23 in the form of the optical pulse signal Py which has the peak value lower than the instantaneous intensity at that time by a level corresponding to the insertion loss of the electroabsorption optical modulator 23.

Thus, the optical signal Px of the monitoring target which has been passed through the electroabsorption optical modulator 23 is supplied in the form of the optical pulse signal Py from the other optical terminal 23b of the electroabsorption optical modulator 23 through the photocoupler 25 of the optical sampling unit 22.

Not only the circulator type in which the optical path is divided according to the light beam incident direction but also a spectral type in which the optical path is divided according to a difference in wavelength can be used as the photocoupler 25 of the optical sampling unit 22. In the case of the spectral type, the sampling optical pulse Ps having the wavelength different from that of the optical signal Px is used.

In the circulator type photocoupler 26 inserted in the optical terminal 23a of the electroabsorption optical modulator 23, an optical terminator 27 terminates the sampling optical pulse Ps which is input into the other optical terminal 23b and supplied from the optical terminal 23a in order to prevent the input (leakage) of the optical signal Px of the monitoring target to the transmission path.

A parameter setting unit 28 sets the periods Ts of the sampling optical pulse Ps and sampling clock Es, which are supplied from the sampling optical pulse generation unit 21.

The parameter setting unit 28 receives the information on the clock period Tc (or bit rate) of the data signal modulating the optical signal Px of the monitoring target and the information on the offset time ΔT, and obtains the sampling period Ts from the computation of $$Ts = N \cdot Tc + \Delta T$$

to set the sampling period Ts in the sampling optical pulse generation unit 21.

At this point, the value of N is determined by the clock period Tc of the data signal and the frequency variable range of the signal which capable of generating by the sampling optical pulse generation unit 21.

For example, it is assumed that the offset time ΔT is so small that the offset time ΔT is negligible for the sampling period Ts, and that the Tc clock period is about 0.1 ns (10 GHz) while the sampling period Ts can be changed around 0.1 μs (10 MHz). Then, the value of N becomes about Ts/Tc=1000.

As described above, the optical pulse signal Py supplied through the photocoupler 25 of the optical sampling unit 22 is input into the photoelectric converter 30, whereby the photoelectric converter 30 converts the optical pulse signal Py into the electric signal Ey and outputs the electric signal Ey.

The analog/digital (A/D) converter 31 performs the sampling of the electric signal Ey supplied from the photoelectric converter 30, and converts the electric signal Ey into the digital value and outputs the digital value as a data signal Dy.

The sampling performed by the A/D converter 31 is performed using a sampling clock Es synchronized with the sampling optical pulse Ps.

In the embodiment, it is assumed that the electric sampling clock Es is also supplied from the sampling optical pulse generation unit 21 (the reference signal generator 21a).

A computation unit 40 computes the value indicating the quality of the optical signal Px of the monitoring target based on the data signal Dy.

Any computation technique may be used to compute the value indicating the quality of the optical signal Px of the monitoring target in the computation unit 40. For example, as described in Patent Document 1, the data signal Dy written in a waveform memory 39 is compared with a predetermined threshold value to classify the data signals Dy into a sample value belonging to data "1" and a sample value belonging to data "0", an average value and a standard deviation of a group of the sample values are obtained for each of the data "1" and the data "0", and a ratio μ/γ of a difference μ of the average values and the sum γ of the standard deviations are obtained as a quality value Q.

It is shown that the quality of the optical signal Px of the monitoring target is enhanced as the Q value is increased.

The quality value Q is computed at predetermined time intervals, and a notification of the result is provided to another device at predetermined timing.

The value indicating the signal quality is not limited to the Q value, and another statistical amount may be used.

The parameter setting unit 36 sets the sampling optical pulse Ps and the period Ts of the sampling clock Es, which are supplied from the sampling optical pulse generation unit 21.

The parameter setting unit 36 receives the information on the clock period Tc (or bit rate) of the data signal modulating the optical signal Px of the monitoring target and the information on the offset time ΔT, and obtains the sampling period Ts from the computation of Ts=N·Tc+ΔT to set the sampling period Ts in the sampling optical pulse generation unit 21.

At this point, the value of N is determined by the clock period Tc of the data signal and the frequency variable range of the signal which can be supplied from the sampling optical pulse generation unit 21.

For example, it is assumed that the offset time ΔT is so small that the offset time ΔT is negligible for the sampling period Ts, and that the Tc clock period is about 0.1 ns (10 GHz) while the sampling period Ts can be changed around 0.1 μs (10 MHz). Then, the value of N becomes about Ts/Tc=1000.

A waveform of the optical signal Px of the monitoring target and timing at which the computation unit 35 obtains the waveform will be described below.

Figure 4:
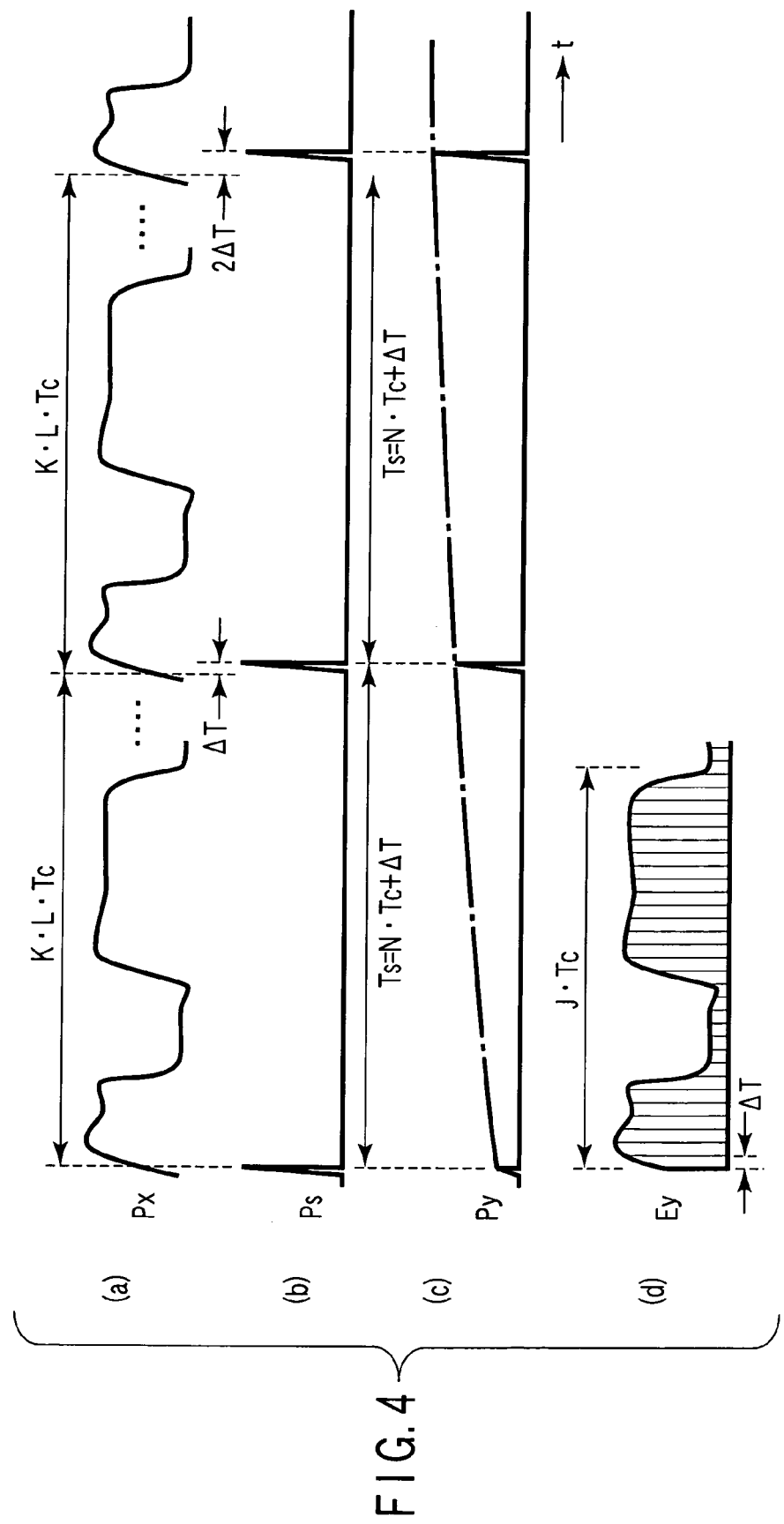
FIG. 4 is a waveform chart for explaining an operation for an optical signal which is a repetitive waveform, as an operation of the embodiment performed by the configuration of FIG. 1.

In the case where the optical signal Px of the monitoring target is used for a test to repeatedly modulate the optical signal Px in a period of a predetermined code string having a predetermined bit length L as shown in (a) of FIG. 4, the value of N determining the period Ts of the sampling optical pulse Ps is equalized to K integral multiplications of the bit length L as shown in (b) of FIG. 4. Therefore, the sampling can be performed in time series at each time ΔT as shown in (c) of FIG. 4 for the repetitive waveform of the optical signal Px of the monitoring target.

The sampling is continuously performed U·Tc/ΔT times (U is an integer), which allows the waveform data of the U bits to be obtained in time series from the sampling start timing.

Figure 5:
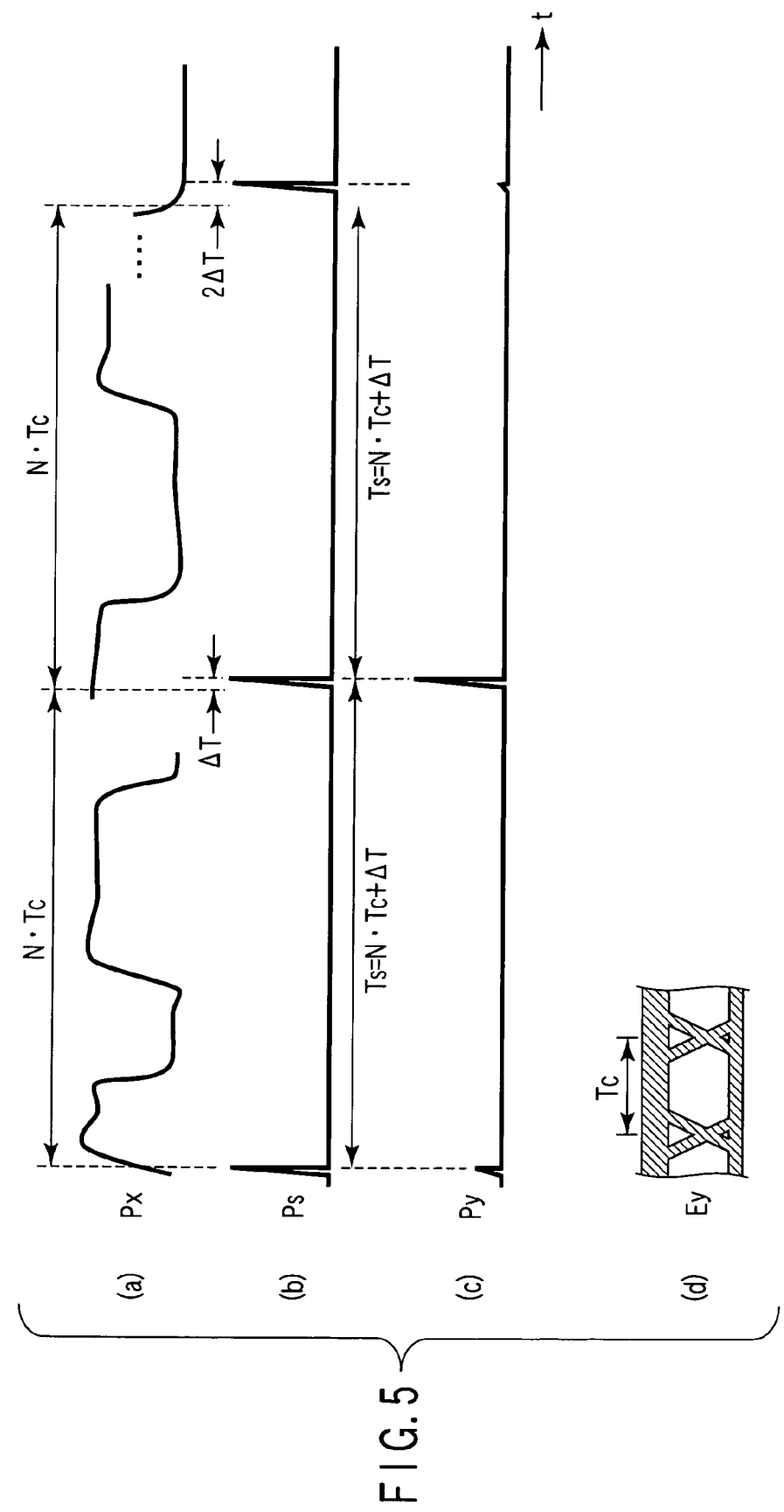
FIG. 5 is a waveform chart for explaining an operation for an optical signal which is not the repetitive waveform, as the operation of the embodiment performed by the configuration of FIG. 1.
Figure 6:
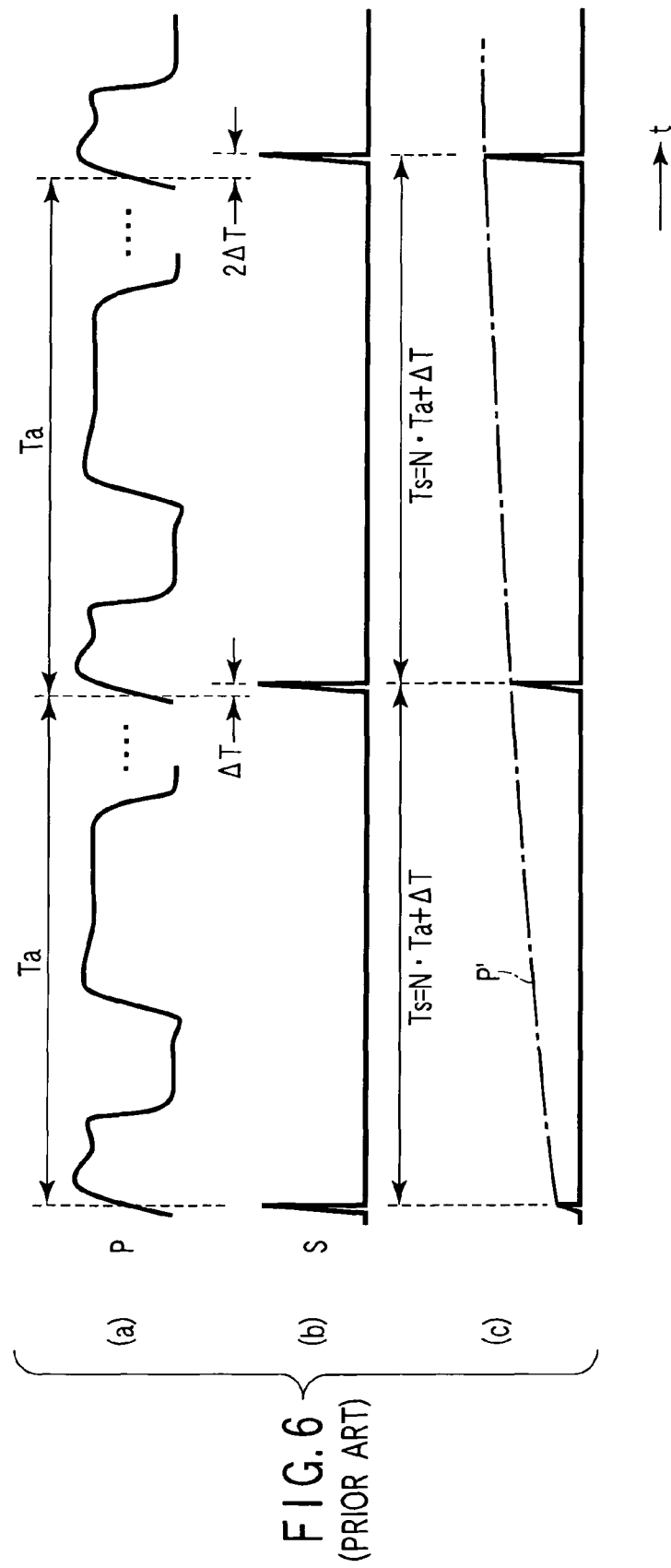
FIG. 6 is a waveform chart for explaining an equivalent time sampling method adopted in a conventional optical signal quality monitoring apparatus.

The optical signal Px actually transmitted on the optical network does not have the simple repetitive waveform shown in (a) of FIG. 4, but has a complicated waveform shown in (a) of FIG. 5.

In the case where the sampling is performed with the period Ts of N·Tc+ΔT shown in (b) of FIG. 5 to the optical signal Px which does not have the simple repetitive waveform, because the sampling is performed to every N-bit data of the optical signal Px at timing shifted by ΔT, the value obtained by the sampling becomes an amplitude corresponding to the data "1" or the data "0" or an amplitude in a transition state between the data "1" and the data "0" as shown in (c) of FIG. 5, and the sampling result cannot be obtained for the continuous waveform having a constant interval of the optical signal Px.

However, the sampling is continuously performed to the plural bits to obtain the statistical amount, which allows the quality value Q to be obtained.

In the case where the invention is applied to the synchronous sampling, the sampling results of the plural bits are overlapped into the one-bit width to obtain an eye pattern as shown in (d) of FIG. 5, so that the signal quality may be obtained from the eye pattern.

In the case where the invention is applied to the asynchronous sampling, because the observed waveform obtained by the overlap of the sampling results streams, the eye pattern cannot be observed.

However, the sampling is performed at predetermined intervals to obtain the statistical amount, which allows the quality value Q to be obtained.

Thus, according to the invention, the problem of the conventional technique can be solved to provide the optical signal quality monitoring apparatus and method, in which the sampling can accurately be performed to the information on the waveform of the high-speed optical signal with the high sampling efficiency and sufficient resolution, whereby the quality of the optical signal can correctly be monitored.

The invention claimed is:

1. An optical signal quality monitoring apparatus comprising:
   a sampling optical pulse generation unit which emits a sampling optical pulse having a period Ts different from a predetermined offset time ΔT to integral N multiplication of a clock period Tc of a data signal modulating an optical signal of a monitoring target;
   an optical sampling unit which supplies an optical pulse signal obtained by sampling the optical signal of the monitoring target using the sampling optical pulse emitted from the sampling optical pulse generation unit;
   a photoelectric converter which receives the optical pulse signal supplied from the optical sampling unit, and converts the optical pulse signal into an electric signal to supply the electric signal; and
   a computation unit which computes a value indicating quality of the optical signal of the monitoring target based on the electric signal from the photoelectric converter,
   wherein the optical sampling unit includes:
   an electroabsorption optical modulator which has two optical terminals used to input and output light, and a power supply terminal imparting an electric field to an optical path connecting the two optical terminals, the electroabsorption optical modulator having a characteristic in which an absorption index is changed with respect to the light propagating through the optical path according to a level of the electric field, the electroabsorption optical modulator receiving the optical signal of the monitoring target at one of the two optical terminals;
   a direct-current power supply which applies a predetermined direct-current voltage to the power supply terminal of the electroabsorption optical modulator, the electroabsorption optical modulator exhibiting a high absorption index with respect to the optical signal of the monitoring target at the predetermined direct-current voltage; and
   a photocoupler which receives the sampling optical pulse emitted from the sampling optical pulse generation unit of the optical signal sampling apparatus to input the sampling optical pulse into another of the two optical terminals of the electroabsorption optical modulator, and receives the optical signal of the monitoring target emitted from the other of the two optical terminals of the electroabsorption optical modulator to input the optical signal as the optical pulse signal into the photoelectric converter,
   wherein when the sampling optical pulse is supplied, the absorption index is lowered by a mutual absorption saturation characteristic of the electroabsorption optical modulator, and the optical signal of the monitoring target is passed onto a side of the other of the two optical terminals of the electroabsorption optical modulator to perform sampling.

2. The optical signal quality monitoring apparatus according to claim 1,
   wherein, in order to prevent leakage of the sampling optical pulse to a transmission path of the optical signal of the monitoring target, the sampling optical pulse being input into the other of the two optical terminals of the electroabsorption optical modulator,
   the optical sampling unit further includes:
   a second photocoupler which is inserted into the one of the two optical terminals of the electroabsorption optical modulator; and
   an optical terminator which terminates the sampling optical pulse through the second photocoupler.

3. The optical signal quality monitoring apparatus according to claim 1,
   wherein the sampling optical pulse generation unit includes:
   a reference signal generator having a synthesizer configuration in which a stable signal is produced, the stable signal having a period Ts corresponding to a period of the sampling optical pulse;
   a multiplier which supplies the stable signal as a signal multiplied by a factor of M (M is more than one), the stable signal being produced by the reference signal generator and having the period Ts;
   a light source which emits continuous light;
   an optical modulator which modulates the continuous light emitted from the light source by the signal multiplied by the factor of M supplied from the multiplier, thereby emitting an optical pulse having a period Ts/M;

an optical gating circuit which thins out the optical pulse emitted from the optical modulator into 1/M, and converts the optical pulse into an optical pulse having the period Ts; and a dispersion-decreasing fiber which narrows a pulse width of the optical pulse having the period Ts and converted by the optical gating circuit, and emits the optical pulse in a form of the sampling optical pulse.

4. The optical signal quality monitoring apparatus according to claim 1, further including a parameter setting unit which receives information on a clock period Tc of the data signal modulating the optical signal of the monitoring target or information on a bit rate of the data signal and information on the predetermined offset time $\Delta T$ to obtain a sampling period Ts of the sampling optical pulse from computation of $$Ts=N \cdot Tc+\Delta T$$

(where a value of N is determined by the clock period Tc of the data signal and a frequency variable range of a signal which can be supplied from the sampling optical pulse generation unit), the parameter setting unit setting the sampling period Ts of the sampling optical pulse in the sampling optical pulse generation unit.

5. The optical signal quality monitoring apparatus according to claim 1, further including an analog/digital (A/D) converter which is inserted between the photoelectric converter and the computation unit, converts the electric signal from the photoelectric converter into a digital value by sampling the electric signal with a sampling clock synchronized with the sampling optical pulse, and supplies the digital value as a data signal to the computation unit.

6. The optical signal quality monitoring apparatus according to claim 5, wherein the sampling clock is output while the sampling optical pulse generation unit synchronizes the sampling clock with the sampling optical pulse.

7. An optical signal quality monitoring method comprising:

a sampling optical pulse generation step of emitting a sampling optical pulse having a period different from a predetermined offset time $\Delta T$ to integral N multiplication of a clock period Tc of a data signal modulating an optical signal of a monitoring target;

an optical sampling step of supplying an optical pulse signal obtained by sampling the optical signal of the monitoring target using the sampling optical pulse emitted by the sampling optical pulse generation step;

a photoelectric conversion step of receiving the optical pulse signal supplied by the optical sampling step and converting the optical pulse signal into an electric signal to supply the electric signal; and a computation step of computing a value indicating quality of the optical signal of the monitoring target based on the electric signal from the photoelectric conversion step, wherein the optical sampling step includes:

a step of preparing an electroabsorption optical modulator which has two optical terminals used to input and output light, and a power supply terminal imparting an electric field to an optical path connecting the two optical terminals, the electroabsorption optical modulator having a characteristic in which an absorption index is changed with respect to the light propagating through the optical path according to a level of the electric field, the electroabsorption optical modulator receiving the optical signal of the monitoring target at one of the two optical terminals;

a step of preparing a direct-current power supply which applies a predetermined direct-current voltage to the power supply terminal of the electroabsorption optical modulator, the electroabsorption optical modulator exhibiting a high absorption index with respect to the optical signal of the monitoring target at the predetermined direct-current voltage; and a step of preparing a photocoupler which receives the sampling optical pulse emitted by the sampling optical pulse generation step to input the sampling optical pulse into another of the two optical terminals of the electroabsorption optical modulator, and receives the optical signal of the monitoring target emitted from the other of the two optical terminals of the electroabsorption optical modulator to output as the optical pulse signal converting into the electric signal by the photoelectric conversion step, wherein when the sampling optical pulse is supplied, the absorption index is lowered by a mutual absorption saturation characteristic of the electroabsorption optical modulator, and the optical signal of the monitoring target is passed onto a side of the other of the two optical terminals of the electroabsorption optical modulator to perform sampling.

8. The optical signal quality monitoring method according to claim 7, wherein, in order to prevent leakage of the sampling optical pulse to a transmission path of the optical signal of the monitoring target, the sampling optical pulse being input into the other of the two optical terminals of the electroabsorption optical modulator, the optical sampling step further includes:

a step of preparing a second photocoupler which is inserted into the one of the two optical terminals of the electroabsorption optical modulator; and a step of preparing an optical terminator which terminates the sampling optical pulse through the second photocoupler.

9. The optical signal quality monitoring method according to claim 7, wherein the sampling optical pulse generation step includes:

a step of preparing a reference signal generator having a synthesizer configuration in which a stable signal is produced, the stable signal having a period Ts corresponding to a period of the sampling optical pulse;

a step of preparing a multiplier which supplies the stable signal as a signal multiplied by a factor of M (M is more than one), the stable signal being produced by the reference signal generator and having the period Ts;

a step of preparing a light source which emits continuous light;

a step of preparing an optical modulator which modulates the continuous light emitted from the light source by the signal multiplied by the factor of M supplied from the multiplier, thereby emitting an optical pulse having a period Ts/M, a step of preparing an optical gating circuit which thins out the optical pulse emitted from the optical modulator into 1/M, and converts the optical pulse into an optical pulse having the period Ts; and a step of preparing a dispersion-decreasing fiber which narrows a pulse width of the optical pulse having the period Ts and converted by the optical gating circuit, and emits the optical pulse in a form of the sampling optical pulse.

10. The optical signal quality monitoring method according to claim 7, further including a step of preparing a parameter setting unit which receives information on a clock period Tc of the data signal modulating the optical signal of the monitoring target or information on a bit rate of the data signal and information on the predetermined offset time $\Delta T$ to obtain a sampling period Ts of the sampling optical pulse from computation of $$Ts = N \cdot Tc + \Delta T$$

(where a value of N is determined by the clock period Tc of the data signal and a frequency variable range of a signal which can be supplied by the sampling optical pulse generation step), the parameter setting unit setting the sampling period Ts of the sampling optical pulse in the sampling optical pulse generation unit.

11. The optical signal quality monitoring method according to claim 7, further including an analog/digital (A/D) conversion step of converting the electric signal from the photoelectric conversion step into a digital value by sampling the electric signal with a sampling clock synchronized with the sampling optical pulse and supplying the digital value as a data signal, wherein, in the computation step, a value indicating quality of the optical signal of the monitoring target is computed based on the data signal supplied by the A/D conversion step.

12. The optical signal quality monitoring method according to claim 11, wherein, in the computation step, the data signal is compared with a predetermined threshold value and is classified into a sample value belonging to data "1" and a sample value belonging to data "0", an average value and a standard deviation of a group of sample values are obtained for each of the data "1" and the data "0", and a ratio $\mu/\gamma$ of a difference $\mu$ between the average values of the data "1" and the data "0" and a sum $\gamma$ of the standard deviations is obtained as a quality value Q.

* * * * *